April 28, 1970  S. L. KURICHH  3,508,585
DAMPED LEVELING VALVE
Filed Dec. 4, 1967  4 Sheets-Sheet 4
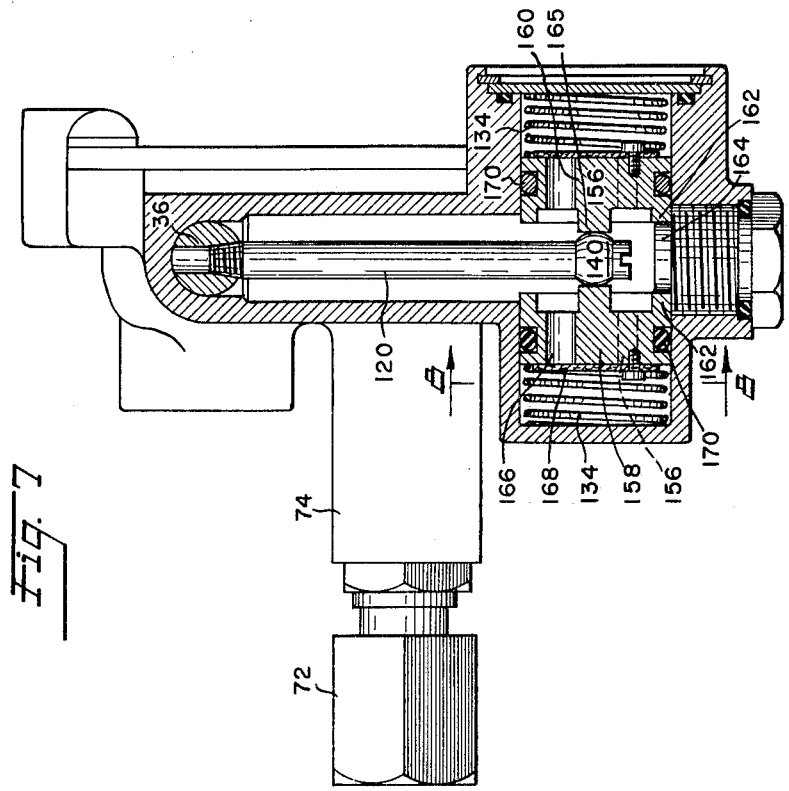
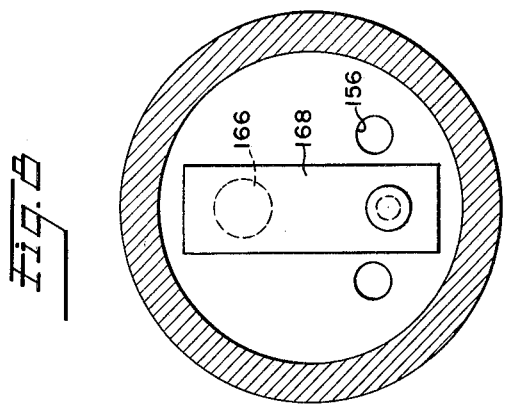
INVENTOR
SHAM L. KURICHH
BY
*Scrivener Parker Scrivener + Clarke*
ATTORNEYS

United States Patent Office 3,508,585
Patented Apr. 28, 1970

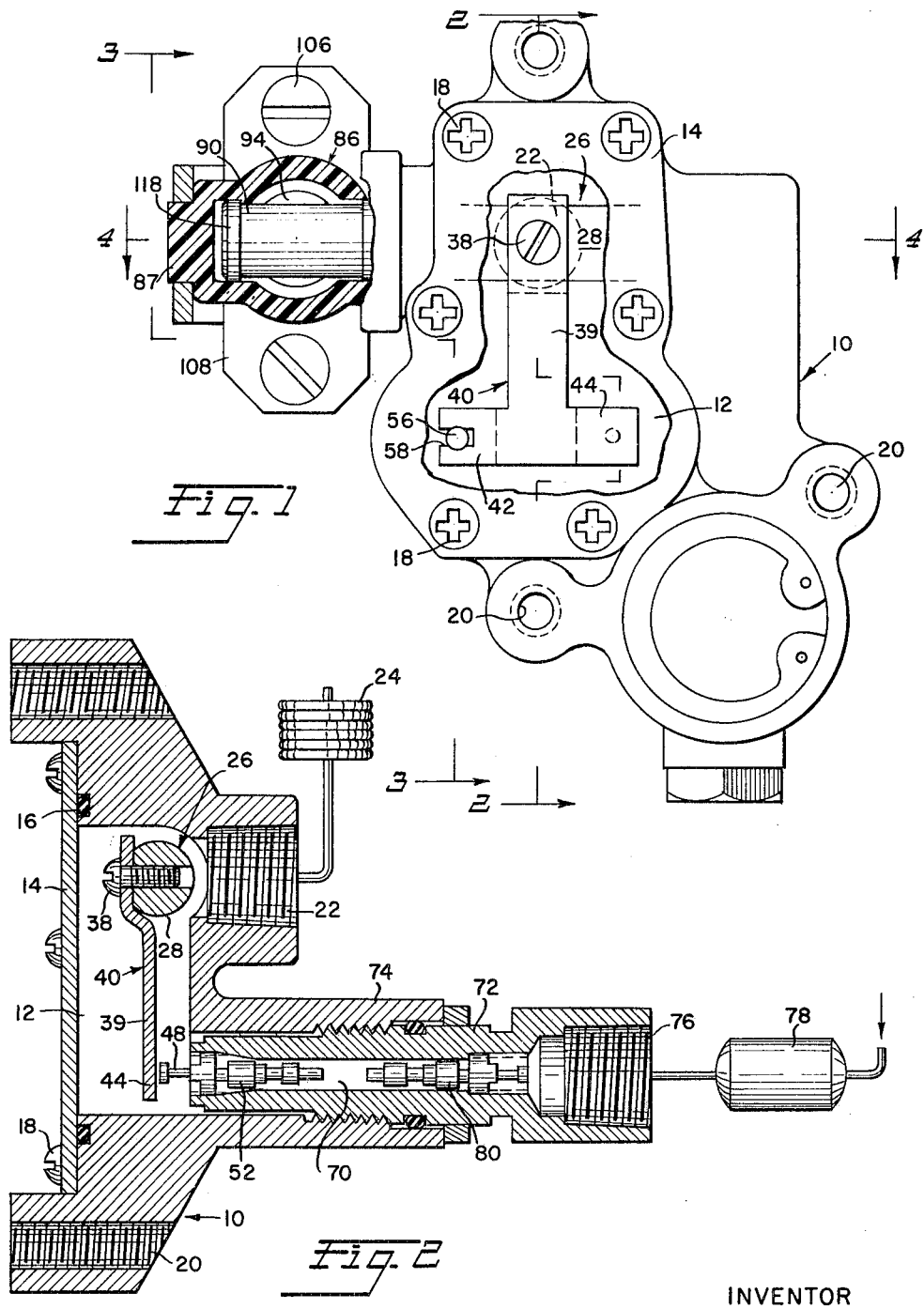

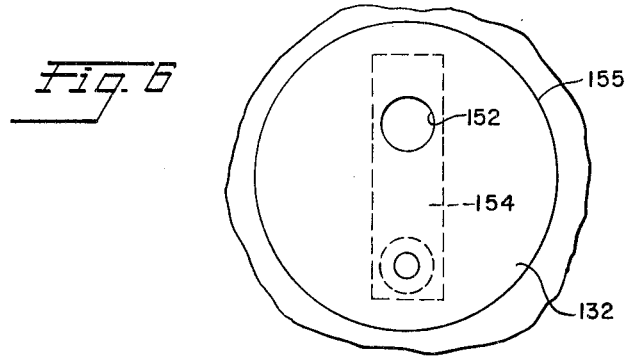
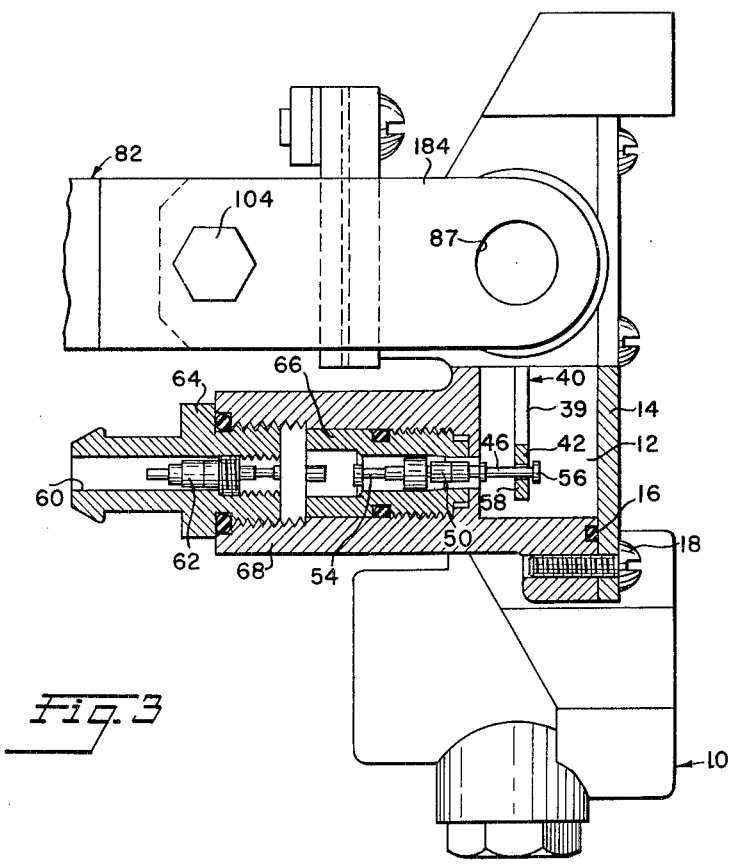

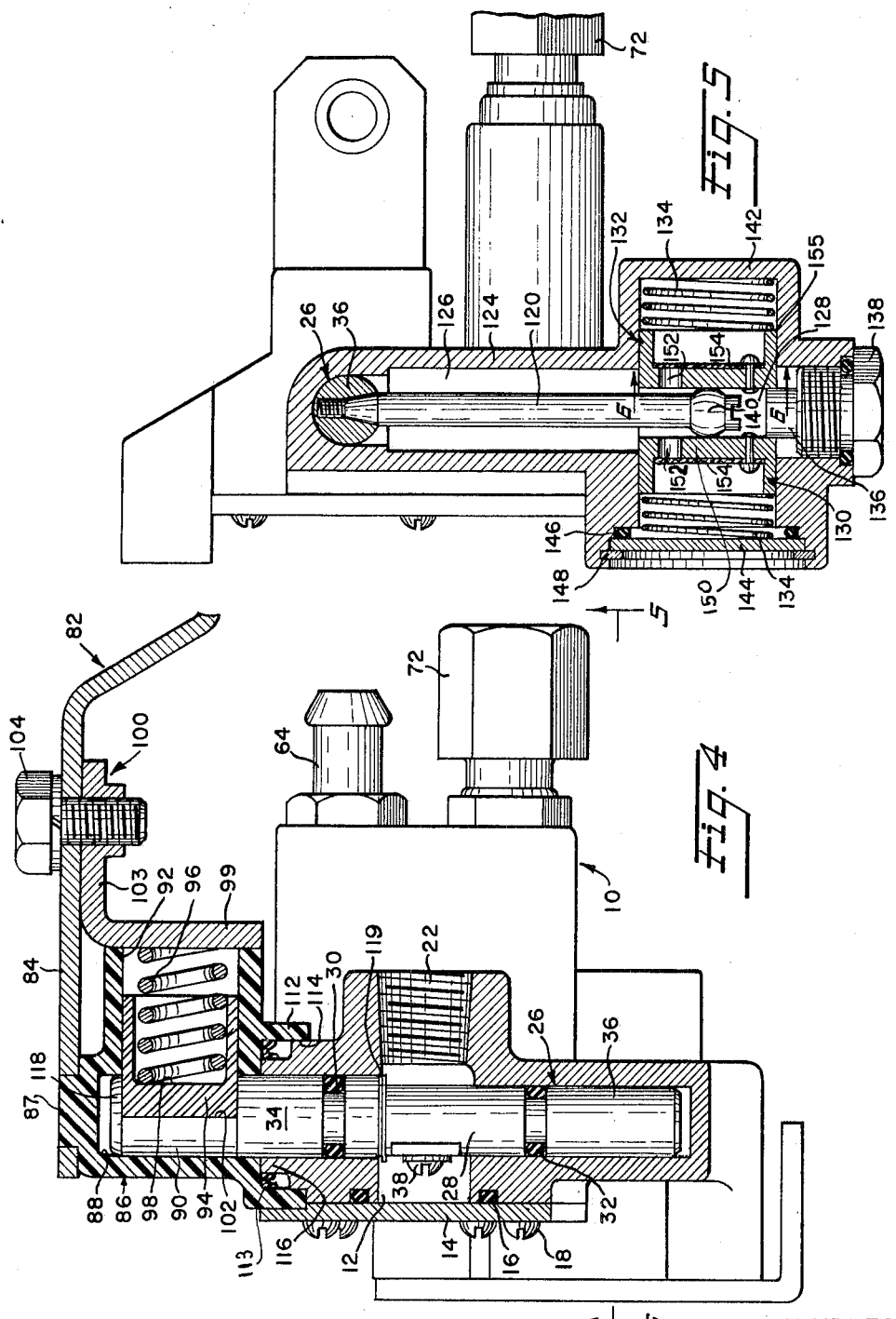

3,508,585
DAMPED LEVELING VALVE
Sham L. Kurichh, Elyria, Ohio, assignor to Bendix-Westinghouse Automotive Air Brake Company, Elyria, Ohio, a corporation of Delaware
Filed Dec. 4, 1967, Ser. No. 687,660
Int. Cl. F17d 3/00
U.S. Cl. 137—627.5                                1 Claim

ABSTRACT OF THE DISCLOSURE

A leveling valve for vehicle air springs including an improved damper comprising a pair of opposed pistons operating in hydraulic cylinders and receiving between them the end of a lever arm carried by an oscillatable valve operating shaft, the arrangement including a fixed stop between the pistons which is normally engaged by both pistons whereby when one of the pistons is moved by the lever arm away from the abutment, the other piston has no effect and particularly does not impede the return of the first piston to its normal position engaging the stop.

---

This invention relates to leveling valves for vehicle air springs.

The flow of pressure fluid to and from an air spring in response to vehicle load is controlled by a leveling valve disposed between a supply of fluid pressure and the air spring fixed to either the sprung or unsprung part of a vehicle. A control lever extends between the valve and the other part of the vehicle and as the load on the vehicle is changed, the air spring collapses or expands depending upon whether the load is being increased or decreased with the lever being angularly moved in response to the relative movement of the sprung and unsprung parts to operate the leveling valve to exhaust air pressure from the air spring when the load is lightened or to supply pressure to the spring upon an increase in load. When the body of the vehicle has been returned by the spring to an established position with respect to the unsprung part of the vehicle the lever is moved to a neutral or lap position so that air is neither admitted to nor exhausted from the spring.

Obviously, it is undesirable that air pressure needlessly flows into or out of the spring as the result of jounce during over-the-road vehicle operation and this is customarily prevented by the provision of a resiliently yielding over travel connection between the leveling valve actuating lever and an operating member in the valve. The operating member in turn is provided with damping means whereby rapid movement of the operating member is resisted though a prolonged force tending to move the member in one direction or the other is effective to overcome the damping means to actuate the valve to control the flow of pressure to or from the air springs. The damping means which heretofore have most frequently been employed comprises a member such as a piston, vane or the like which is moved through damping liquid by an arm connected to the valve operating member with the liquid being passed by way of a restriction from one side of the member to the other. Though this arrangement is usually satisfactory, it will be apparent that when the liquid is passed in one direction through the restriction, in order for the damping means and thus the valve actuating member to return to its neutral position, the liquid must pass in the opposite direction through the restriction so that the return of the elements to their neutral position is unnecessarily delayed resulting in over or under inflation of the air spring.

It is the object of the present invention to overcome the foregoing difficulty by the provision of two pistons which may be moved in opposite directions entirely independently of each other by actuating means such as an arm carried by the valve operating member, with each piston cooperating with separate liquid restricting means whereby movement of a piston away from a neutral position is resisted. In accordance with the invention each piston is spring urged towards its neutral position and is provided with a check valve which is moved to closed position when the piston is moved away from its neutral position but is readily opened to permit the free passage of liquid through the piston during return movement of the latter toward its neutral position so that there is no delay in returning the valve to lap position when the proper level of the vehicle has been restored.

Another object of the invention is to provide in combination with independently movable damping pistons of the foregoing nature, improved stop means whereby when one piston is being operated, the other is retained totally inactive so as to have no unnecessary retarding effect on the operation of the leveling valve.

The foregoing and other objects of the invention will become apparent as the following detailed description is read in conjunction with the accompanying drawings wherein:

FIG. 1 is a vertical elevational view, with portions broken away, of a leveling valve embodying the features of the invention;

FIG. 2 is a cross-sectional view taken substantially on the line 2—2 of FIG. 1;

FIG. 3 is a vertical cross-sectional view taken substantially on the line 3—3 of FIG. 1;

FIG. 4 is a horizontal cross-sectional view taken substantially on the line 4—4 of FIG. 1 and turned 90°;

FIG. 5 is a vertical cross-sectional view showing one embodiment of the damper means of the present invention taken substantially on the line 5—5 of FIG. 4;

FIG. 6 is an enlarged vertical cross-sectional view taken substantially on the line 6—6 of FIG. 5;

FIG. 7 is a view similar to FIG. 5 but showing a second embodiment of the invention; and FIG. 8 is a vertical cross-sectional view taken substantially on the line 8—8 of FIG. 7.

Referring now to the drawings, the numeral 10 designates the body portion of the present invention containing a central valve cavity 12 closed by a cover plate 14 which is secured in place against sealing ring 16 by means of suitable screws 18. The body 10 is provided with a plurality of threaded mounting holes 20 whereby the valve may be secured to either the sprung or unsprung portion of a vehicle, such as an axle housing. Leading into the valve cavity 12 is a port 22 which is at all times in open communication with air spring schematically indicated at 24 in FIG. 2. Extending through the upper portion of the valve cavity 12 is a valve operating shaft 26 having a central portion 28 in the cavity 12 (see FIGS. 1 and 4), which is sealed off by O-rings 30, 32 from the end extremities 34, 36 of the shaft. Connected to the central portion 28 of the shaft 26 by a suitable screw 38 is the upper end of the vertical arm 39 of an inverted T-shaped valve operating member 40 having at its lower end opposed horizontal arm parts 42, 44.

The horizontal parts 42, 44 of the valve operating member 40 register respectively with plungers 46, 48 of exhaust and supply valves 50, 52, which are generally similar to conventional tire valves except that in the case of the valve 50 (see FIG. 3) the plunger 46 extends through the valve body and is connected to the conventional plunger 54 which may be pulled inwardly by the plunger 46 to open the valve when the valve operating member 40 is moved counter clockwise in FIG. 3, it being observed that the plunger 46 is provided with a head 56 which is received within a slot 58 in the arm 42 of the valve operating member 40. When the exhaust valve 50 is thus opened, fluid pressure in the valve cavity 12 and hence in the air spring 24 flows through the valve 50 and an exhaust passage 60 to atmosphere, it being observed that a second valve 62, similar to valve 50, is disposed in the exhaust passage 60, the arrangement being such that the valve 62 is opened in response to pressure above a predetermined level passed by the exhaust valve 50, the valve 62 closing at some relatively low value on the order of 7–10 p.s.i. so as to trap at least some pressure at all times in the air spring 24 if, for some reason, the valve 50 should be accidentally struck in an open position. As can be seen, the valves 50, 62 are received in respective body members 64, 66 screwed into an interiorally threaded hollow neck 68 integral with thhe body 10.

With reference to FIG. 2, the supply valve 52 is received in an inlet passage 70 extending through a body member 72 threaded into a hollow neck 74 integral with the body 10. At the outer end of the member 72 is an inlet port 76 in direct communication with a source of fluid pressure 78 which may be a fluid pressure reservoir supplied with pressure from a compressor (not shown) in the conventional manner. Received within the passage 70 is a second valve 80 similar to valve 52, the purpose of the valve 80 being to serve as a check valve which permits the flow of fluid pressure from the reservoir 78 to the valve cavity 12 when the valve 52 is open but prevents flow in the reverse direction. As will be obvious from FIG. 2 the valve 52 is moved to open position when the valve operating member 40 is moved in a counter clockwise direction in FIG. 2 to remove the arm part 44 of the member 40 against the plunger 48 so as to open the valve.

Assuming that the body 10 is fixed to an unsprung portion of the vehicle, the shaft 26 carrying the valve operating member 40 is operated in opposite directions by means of a lever 82 having its inner end 84 connected to the shaft 26 through a resiliently yielding over travel connection, hereinafter described, and its outer end (not shown) connected to the sprung portion of the vehicle. With reference to FIG. 4, the inner end 84 of the lever is resiliently yieldingly connected to the shaft 26 through the medium of a housing 86 having an axial cylindrical boss 87 on the outer side thereof rotatably engaged in an aperture adjacent the end of the lever. The housing 86 contains a first cavity 88 adapted to rotatably receive an extending end 90 of the shaft 26 and a second cylindrical cavity 92 at right angles to the cavity 88 and adapted to slidably receive a hollow piston member 94 open at its outer end and urged by a spring 96 interposed between an end wall 98 in the interior of the piston 94 and one arm 99 of an L-shaped cover member 100 into engagement with a flat 102 formed in the end part 90 of the shaft 26. The cover member 100 has its other arm 103 secured to the lever 82 by a screw 104 with its first arm being provided with ears for connection by machine screws 106 to mating ears 108 (see FIGS. 1 and 3) integral with the housing member 86.

With reference again to FIG. 4, the housing member 86 is freely rotatable on the end part 34 of the shaft 26, but free rotation of the housing 86 with respect to the shaft 26 is resisted by its engagement with the flat 102, the arrangement being such that when the lever 82 is oscillated back and forth the piston 94 through the spring 96 operates on the flat 102 to tend to rotate the shaft in one direction or the other depending upon the direction of movement of the lever 82.

Dirt and the like is prevented from entering the cavities 88, 92 by the provision of an integral annular collar 112 on the inner side of the housing member 86 and whose inner surface rotatably engages an annular shoulder 114 on the exterior of an axial neck part 116 integral with the body 10 of the valve.

As can be seen in FIG. 4, it will be observed that relative axial movement of the lever 82 and housing member 86 with respect to the valve housing 10 is prevented by providing the extreme end of the shaft with a head part 118 whereby the member 94 is snugly engaged on opposite sides as shown. The shaft 26, in turn, is prevented from moving axially with respect to the valve housing 10 by the provision of a snap ring 119 received in a suitable groove about the central portion 28 of the shaft 26, it being observed in FIG. 4 that the ring abuts the side wall of the cavity 12 to positively prevent movement of the shaft 26 axially outwardly of the housing 10.

From the foregoing description it will be apparent that if some form of damping means were not provided for the shaft 28, it would oscillate back and forth with the lever 82 at all times including periods when the lever is oscillating solely as the result of jounce during over-the-road operation. By providing suitable damping means, rapid rotation of the shaft 28 is prevented and thus the lever 82 oscillates independently of the shaft 28 with the piston 94 rocking on the flat 102 without any pronounced effect on the shaft. With reference now to FIG. 5, the damping means of the invention comprises an arm 120 which extends downwardly at right angles to the end 36 of the shaft 28, the upper end of the arm 120 being connected in any suitable manner to the part 36 of the shaft as for example by being screwed into a suitably threaded opening as shown.

The arm 120 is surrounded by a sealed housing part 124 having an inner wall suitably spaced from the arm 120 to afford an elongated vertical cavity or chamber 126 whose lower end opens into a cylindrical cavity 128 at right angles to the cavity 126 and slidably receiving a pair of opposed cup-shaped pistons 130, 132, which are urged by springs 134 towards each other and into engagement with a stop member 136 constructed in accordance with the invention. As can be seen, the stop member comprises preferably a cylindrical boss carried centrally on the upper surface of a threaded closure member 138 received in a threaded opening co-axial with the chamber 126, the boss extending sufficiently far into the path of movement of the pistons 132 so as to afford positive stop means for each of the pistons with the latter being spaced apart by the stop means a predetermined distance when the parts of the damper are in the neutral position of FIG. 5.

The lower end of the arm 120 is provided with a part spherical enlargement 140 having a horizontal dimension equal to or slightly greater than the corresponding dimension of the boss 136. As can be seen, the springs 134 act between cup-like rims of the pistons and an integral wall 142, with respect to the right hand piston 132, and, with regard to the left hand piston 130, a closure member 144 which is retained against a suitable sealing ring 146 by means of a conventional snap ring 148.

Extending through the vertical bottoms 150 of the pistons are fluid passages 152 which are normally closed by flapper type check valves 154 whose ends opposite the openings 152 are riveted to the inner sides of the pistons 130, 132 as shown. The pistons while having a reasonably snug sliding fit with the cylindrical walls of the cavity 128, are nevertheless sufficiently loosely received therein so as to permit the restricted flow of liquid through a clearance path 155 between the pistons and the walls of the cavity when a piston is moved away from the neutral position of FIG. 5.

The embodiment of the invention illustrated in FIG. 7 is substantially the same as that illustrated in FIG. 5 and like reference numerals refer to like parts. The embodiment of FIG. 7 differs from that of FIG. 5 in that in lieu of restricted fluid passage means between the pistons and the wall of the cylinder, restricted passages 156 are provided through the pistons 158, 160. The pistons, instead of being cup shaped, may be of generally solid construction with an annular inwardly projecting lip 162 adapted to engage stop means 164 which is identical in function to the stop 136 illustrated in FIG. 5. Each of the pistons may be provided with a central boss 165 adapted to be engaged by the part spherical member 140 at the lower end of the rod 120 and, as in the case of the pistons 130, 132 shown in FIG. 5, the pistons 158, 160 are urged by springs 134 towards each other until their lips 162 are in abutment with the stop 164. Extending through the pistons are fluid passages 166 which are controlled by vane type check valves 168. Because the damping fluid traverses the passages 156 through the pistons, the periphery of the latter are sealed against passage of fluid between the piston and the wall of the cylinders by sealing rings 170 as shown.

The operation of the invention should be apparent from the foregoing description. Briefly, when a vehicle is traveling over the road so that the lever 82 is subjected to rapid oscillation due to jounce, rotation of the shaft 26 and hence undesired operation of the supply and exhaust valves 50, 52 are prevented by the resistance of the damping fluid to movement of the damping pistons 130, 132 or 158, 160 away from their neutral positions. Though the shaft 26 is thus restrained against following the oscillations of the lever 82, the lever 82 is nevertheless freely movable with respect to the shaft 26 because of over travel afforded by the aforedescribed yielding engagement of the spring loaded piston 94 with the flat 102 at the outer end of the shaft 26.

When the vehicle is at its destination and the load thereon is changed so that the vehicle body moves towards or away from the axle, the angularity of the lever 82 is changed and the spring loaded piston 94 acts continuously on the flat so as to urge the shaft 26 with a steady force in one direction or the other until the damping piston operating rod 120 has borne sufficiently long on one piston or the other to move it through rolling engagement of the part spherical end part 140 on the piston at a speed determined by the size of the restricted passage means, either the passage 155 between the pistons and the cylinder wall, as in FIG. 5, or the passage 156 through the pistons, as in FIG. 7, to a position wherein either the inlet or exhaust valve is operated to supply or exhaust pressure from the air spring. As the body of the vehicle is moved by the spring back to its designed level with respect to the axle, the operating rod 120 is moved back towards the central position of FIGS. 5 and 7 without any hindrance whatever occasioned by the necessity of having to push back the idle piston to its neutral position, it being understood that during the leveling operation the idle piston was retained in its inoperative position against either the stop 136 or the stop 164 in FIGS. 5 and 7, respectively, so that the parts of the valve return to their central position without any danger of supplying or exhausting an excessive amount of pressure fluid to or from the air spring as might be occasioned by a delay in moving the damping means in the reverse direction toward neutral.

As soon as an outward force of the piston operating arm 120 is removed from a piston and the arm starts on its return to its central position, the spring force on the affected piston moves this, along with the operating arm, towards neutral, it being understood that the flapper check valves 154, 168 open readily to permit substantially unimpeded return of either piston to its central position.

It will be apparent to those skilled in the art that the embodiments of the invention described hereinbefore are representative only and that the invention is susceptible of various modifications and changed without, however, departing from the scope and spirit of the appended claims.

What is claimed is:
1. In combination with a leveling valve for use in a vehicle fluid suspension system, said valve including a casing, a valve operating shaft movable in opposite directions in said casing to operate supply and exhaust valves to control the flow of fluid pressure to and from said suspension system in accordance with load changes on the vehicle, means for mounting the casing on the sprung or unsprung portion of a vehicle and a lever including yielding over-travel mechanism having one end connected to said shaft and the other connected to the unsprung or sprung portion of the vehicle to actuate the shaft in response to relative movement between the sprung and unsprung portions of the vehicle, the invention which comprises damping means for retarding operation of said shaft by said lever comprising a depending housing portion connected to said casing and defining a chamber whose axis is normal to the axis of said shaft, an arm carried by said shaft for rocking movement therewith and extending into said chamber, a pair of opposed aligned cylinders at the lower end of said housing whose common axis is normal to the axis of said chamber, damping fluid in said cylinders, a pair of opposed pistons slidably received in said cylinders, spring means urging said pistons at all times towards each other, fixed stop means interposed between said cylinders and against which said pistons normally abut, said arm extending between said pistons clear of said stop means and having an end part adapted to engage the respective pistons to urge one or the other away from said stop means depending upon the direction of rotation of said shaft, restricted fluid passage means interconnecting one side of each piston with the other side thereof whereby movement of each piston away from said stop means is resisted, non-restricted fluid passage means extending through each of said pistons, and one way check valve means carried by each piston arranged to close said unrestricted fluid passage means when a piston is moved away from said stop means and to open said passage means for the unrestricted flow of damping fluid therethrough when said pistons are moved towards said stop means, said stop means comprising a rigid boss extending between said pistons in axial alignment with the axis of said chamber, a threaded opening in the lower end of said housing in axial alignment with the axis of said chamber, a closure plug received in said opening, said boss being integral with the upper side of said plug and extending upwardly therefrom into the path of movement of at least the lower edge parts of said pistons, and said restricted passage means comprising an open restriction through said pistons from one side to the other thereof.

References Cited

UNITED STATES PATENTS

| | | | |
|---|---|---|---|
| 2,905,462 | 9/1959 | Christensen | 251—54 X |
| 2,938,719 | 5/1960 | Broadwell | 251—54 X |
| 2,939,724 | 6/1960 | Broadwell. | |
| 2,947,530 | 8/1960 | Davis | 251—54 X |
| 2,965,391 | 12/1960 | Whelan. | |

FOREIGN PATENTS 418,396    2/1947    Italy.

CLARENCE R. GORDON, Primary Examiner

U.S. Cl. X.R.

251—54; 267—65; 280—124